(12) United States Patent
Kruger et al.

(10) Patent No.: US 11,158,957 B1
(45) Date of Patent: Oct. 26, 2021

(54) CO-LOCATED ANTENNAS WITH COUPLED ARMS

(71) Applicant: Hewlett-Packard Development Company, L.P., Spring, TX (US)

(72) Inventors: Chris Kruger, San Diego, CA (US); Sung Oh, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,279

(22) PCT Filed: Mar. 7, 2018

(86) PCT No.: PCT/US2018/021328
§ 371 (c)(1),
(2) Date: Jul. 26, 2019

(87) PCT Pub. No.: WO2019/172904
PCT Pub. Date: Sep. 12, 2019

(51) Int. Cl.
*H01Q 21/28* (2006.01)
*H01Q 1/24* (2006.01)
*H01Q 3/34* (2006.01)

(52) U.S. Cl.
CPC ............ *H01Q 21/28* (2013.01); *H01Q 1/241* (2013.01); *H01Q 3/34* (2013.01)

(58) Field of Classification Search
CPC ........... H01Q 21/28; H01Q 1/241; H01Q 3/34
See application file for complete search history.

(56) References Cited

U.S. PATENT DOCUMENTS

| | | | |
|---|---|---|---|
| 6,424,311 B1 | 7/2002 | Tsai et al. | |
| 8,159,399 B2 | 4/2012 | Dorsey et al. | |
| 9,252,490 B2 | 2/2016 | Wei | |
| 2007/0257847 A1 | 11/2007 | Su et al. | |
| 2014/0141731 A1 | 5/2014 | Abudul Gaffoor et al. | |
| 2014/0242930 A1 | 8/2014 | Barker et al. | |
| 2014/0375515 A1* | 12/2014 | Qiu ........................ | H01Q 1/243 343/745 |

(Continued)

FOREIGN PATENT DOCUMENTS

| | | |
|---|---|---|
| CN | 204651490 | 9/2015 |
| WO | WO-2017007040 | 1/2017 |

OTHER PUBLICATIONS

Moradikordalivand Ali et al., Common Elements Wideband MIMO Antenna System.., Sep. 2014, IEEE.

*Primary Examiner* — Hoang V Nguyen
(74) *Attorney, Agent, or Firm* — Perry + Currier Inc.

(57) ABSTRACT

An example device includes a substrate and first and second antennas disposed on the substrate. The first antenna includes a first feed arm to connect to a circuit and a pair of extended arms extending in opposite directions from the first feed arm. The first antenna is co-located with a secondary antenna area. The secondary antenna area is bounded by the first feed arm and by a first extended arm of the pair of extended arms. The secondary antenna area is further to be bounded by a display and by an outer edge of the substrate. The second antenna is disposed within the secondary antenna area and includes a second feed arm to connect to the circuit. The second antenna further includes a coupled arm distant from the second feed arm, the coupled arm positioned between the second feed arm and the first feed arm of the first antenna.

15 Claims, 6 Drawing Sheets

(56) References Cited

U.S. PATENT DOCUMENTS

| | | |
|---|---|---|
| 2015/0119052 A1 | 4/2015 | Caimi et al. |
| 2016/0285161 A1 | 9/2016 | Apaydin et al. |
| 2017/0062952 A1 | 3/2017 | Sundararajan et al. |

* cited by examiner

CO-LOCATED ANTENNAS WITH COUPLED ARMS

BACKGROUND

Antennas may be used in transmitters and receivers in a variety of electronic devices, such as smartphones, tablet computers, notebook computers, and the like. Antennas may be designed to radiate and collect electromagnetic signals, such as radio, microwave, and similar signals. A multiple-input and multiple-output (MIMO) array of antennas may be used to provide multiple transmit and receive paths and increase data throughput.

DETAILED DESCRIPTION

Figure 1:
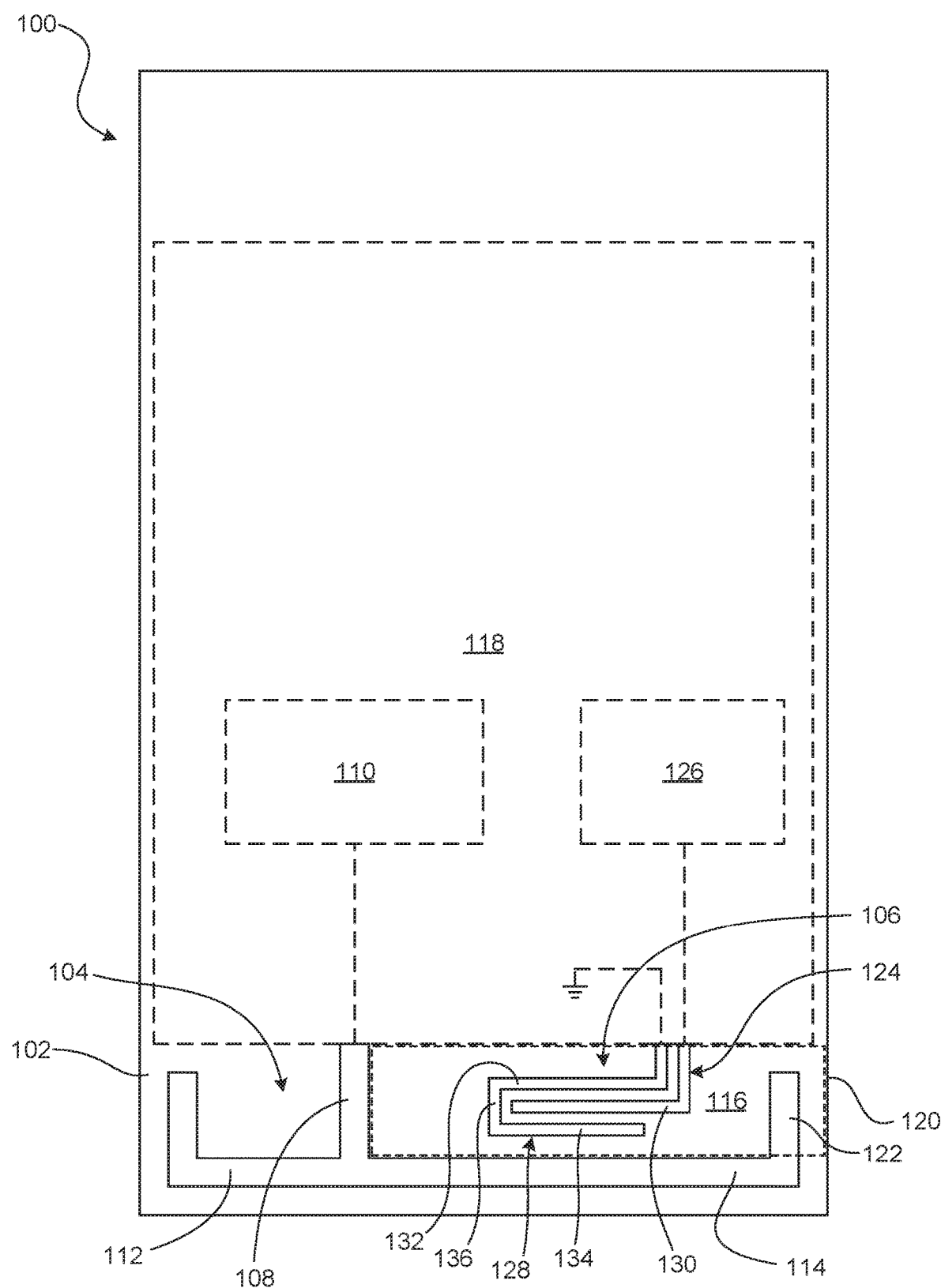
FIG. 1 is a plan view of an example device that includes example co-located and isolated antennas.

An antenna for a wireless local area network (WLAN) may be located within the operating area of an antenna for a wireless wide area network (WWAN). A grounded and capacitively coupled arm of the WLAN antenna may isolate the WLAN antenna from the WWAN antenna. The coupled arm may further allow the WLAN antenna to serve as a diversity antenna for the WWAN antenna. This structure is space efficient and may allow the antennas to be located on the same side of the same substrate at the same Z height. The antennas may be used to implement a 4-by-4 WWAN MIMO array and a 2-by-2 WLAN MIMO array, FIG. 1 shows an example device 100 that includes a substrate 102, a first antenna 104 disposed on the substrate 102, and a second antenna 106 disposed on the substrate 102. The device 100 may be a smartphone, tablet computer, notebook computer, or similar.

The substrate 102 may include a printed circuit board (PCB) or similar structure to receive conductive elements, such as metal traces or areas, that form the antennas 104, 106. The substrate 102 may be planar where the antennas 104, 106 are disposed, in that the antennas 104, 106 may be located on the same side of the substrate 102 and may have the same Z height. The substrate 102 may have several planar surfaces where the antennas 104, 106 are disposed, such that portions of the antennas 104, 106 have the same Z height on the same respective planar facet.

The first antenna 104 includes a first feed arm 108 to connect to a first circuit 110. The first circuit 110 may include a circuit that implements a WWAN (WWAN) transmitter and/or receiver, such as a Long-Term Evolution (LTE) transmitter and/or receiver. In the example of an LTE transmitter and/or receiver, the first circuit 110 may implement LTE low, mid, and high frequency bands.

The first antenna 104 further includes a pair of extended arms 112, 114 extending in opposite directions from the first feed arm 108. The extended arms 112, 114 may be straight, may be angled, may be bent or right-angled as illustrated, or may take other shapes. The first antenna 104 may be a T-shaped antenna. The extended arms 112, 114 may have similar, identical, or symmetric shapes or may be shaped differently.

The first antenna 104 is co-located with a secondary antenna area 116 that contains the second antenna 106. The secondary antenna area 116 is bounded by the first feed arm 108 of the first antenna 104 and by a first extended arm 114 of the pair of extended arms 112, 114 of the first antenna 104. In other examples, the secondary antenna area 116 may be located at the opposing extended arm 112.

When the device 100 is assembled, the secondary antenna area 116 is also bounded by a display 118 and by an outer edge 120 of the substrate 102. For example, the secondary antenna area 116 may be a quadrilateral having four main boundaries, including a top boundary defined by a display 118 to be mounted with respect to the substrate 102. A bottom boundary may be defined by the extended arm 114 of the first antenna 104. A left boundary may be defined by the feed arm 108 of the first antenna 104. A right boundary may be defined by the edge 120 of the substrate 102. In this example, by an upward extension 122 of the extended arm 114 of the first antenna 104 also defines the right boundary. The terms "top", "bottom", "left", and "right" are used for sake of explanation with respect to the view depicted, and these terms carry no positional or directional limitation or other connotation.

The second antenna 106 is disposed within the secondary antenna area 116.

The second antenna 106 includes a second feed arm 124 to connect to a second circuit 126. The second circuit 126 may include a circuit that implements a WLAN transmitter and/or receiver, such as an Institute of Electrical and Electronics Engineers (IEEE) 802.11 or Wi-Fi transmitter and/or receiver. The second circuit 126 may further implement a diversity circuit for the first antenna 104, such as a diversity circuit for mid and high frequency bands for an LTE transmitter and/or receiver.

The first circuit 110 and the second circuit 126 are described separately for sake of explanation and may be considered one circuit.

The second antenna 106 further includes a coupled arm 128 that is distant from the second feed arm 124. That is, the coupled arm 128 is not physically connected to the second feed arm 124. The coupled arm 128 may be grounded. The coupled arm 128 may be connected to a chassis of the device 100, to a common node, or to similar.

The coupled arm 128 is positioned between the second feed arm 124 and the first feed arm 108 of the first antenna 104. The feed arm 124 of the second antenna 106 may include a main length 130 that extends towards the feed arm 108 of the first antenna 104. The coupled arm 128 may include bracketing lengths 132, 134 positioned on opposite sides of the main length 130 of the feed arm 124. The coupled arm 128 may further include a connecting length 136 that connects the bracketing lengths 132, 134 to form an elongated C shape. The coupled arm 128 may surround a substantial portion of the main length 130 of the feed arm 124 and may capacitively couple with the feed arm 124 when the feed arm 124 is excited.

The coupled arm 128 may be capacitively coupled to the second feed arm 124 to implement diversity for mid and high frequency bands of an LTE transmitter and/or receiver. At the same time, the coupled arm 128 may provide isolation between the first and second antennas 104, 106 due to the coupled arm 128 being grounded and partially surrounding the second feed arm 124.

In operation, the first circuit 110 may control the first antenna 104 to communicate with an LTE network, and the second circuit 126 may control the second antenna 106 to communicate with a Wi-Fi network, while providing antenna diversity to the first antenna 104 for LTE communications. For example, the second circuit 126 may control the second antenna 106 to provide support for mid and high LTE frequency bands via capacitive coupling energy of the coupled arm 128 with the feed arm 124 of the second antenna 106.

Figure 2:
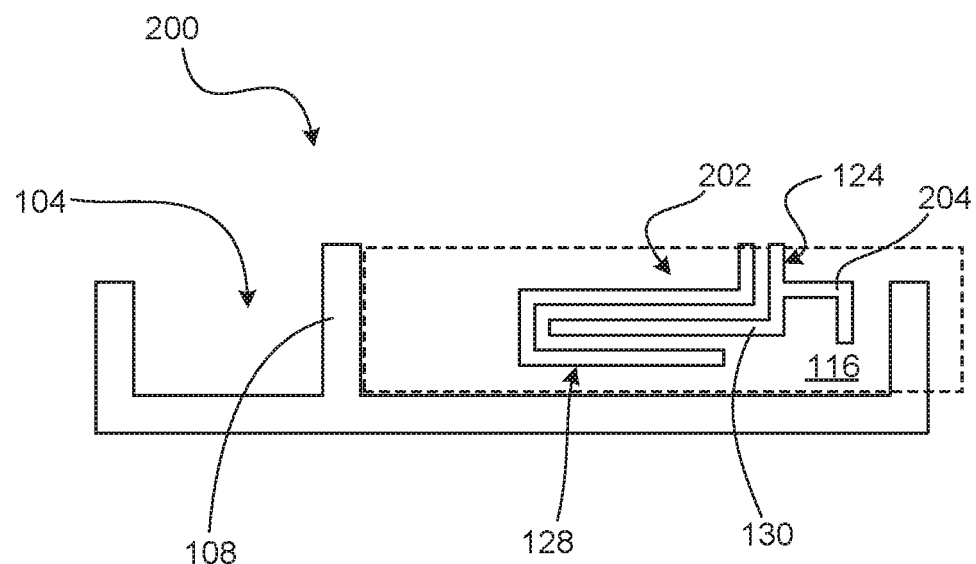
FIG. 2 is a plan view of example co-located and isolated antennas including a dual-band local area antenna.

FIG. 2 shows an example antenna structure 200 including a first antenna 104 and a second antenna 202. Description for the other devices and antennas discussed herein may be referenced, with like reference numerals denoting like components. Features and aspects of the antenna structure 200 may be used with the other devices and antennas discussed herein, and vice versa.

The second antenna 202 may further include a high-frequency arm 204 extending from a second feed arm 124. The high-frequency arm 204 may be straight, angled, or bent, as depicted. The high-frequency arm 204 may allow the second antenna 202 to operate in an additional frequency band of the WLAN. For example, the main length 130 of the second antenna 202 may provide a 2.4 GHz Wi-Fi band and the high-frequency arm 204 may expand a 5 GHz band so that the second antenna 202 provides 2.4 and 5 GHz bands.

The high-frequency arm 204 may be located with the entire second antenna 202 in the secondary antenna area 116. The high-frequency arm 204 may extend from the feed arm 124 in a direction opposite the extension of the main length 130. The high-frequency arm 204 may be positioned with respect to the coupled arm, such that the coupled arm 128 does not fully or partially surround the high-frequency arm 204.

Figure 3:
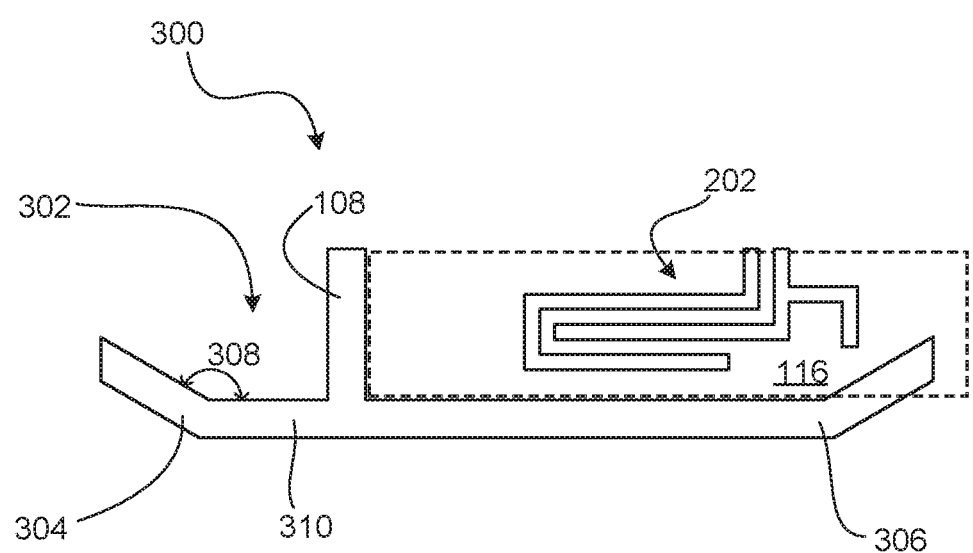
FIG. 3 is a plan view of example co-located and isolated antennas including a wide area antenna having angled arms.

FIG. 3 shows an example antenna structure 300 including a first antenna 302 and a second antenna 202. Description for the other devices and antennas discussed herein may be referenced, with like reference numerals denoting like components. Features and aspects of the antenna structure 300 may be used with the other devices and antennas discussed herein, and vice versa.

The first antenna 302 may include extended arms 304, 306 that extend in opposite directions from a first feed arm 108, including an extended arm 306 that defines a boundary of a secondary antenna area 116 that contains the second antenna 202.

The extended arms 304, 306 may have angled end lengths. That is, an end length may be at angle 308 with respect to a main length 310 that branches from the feed arm 108. Angled end lengths of extended arms 304, 306 may allow the antenna structure 300 to be located on a substrate having a complementary boundary that may facilitate including of the antenna structure 300 in non-rectangular devices.

Figure 4:
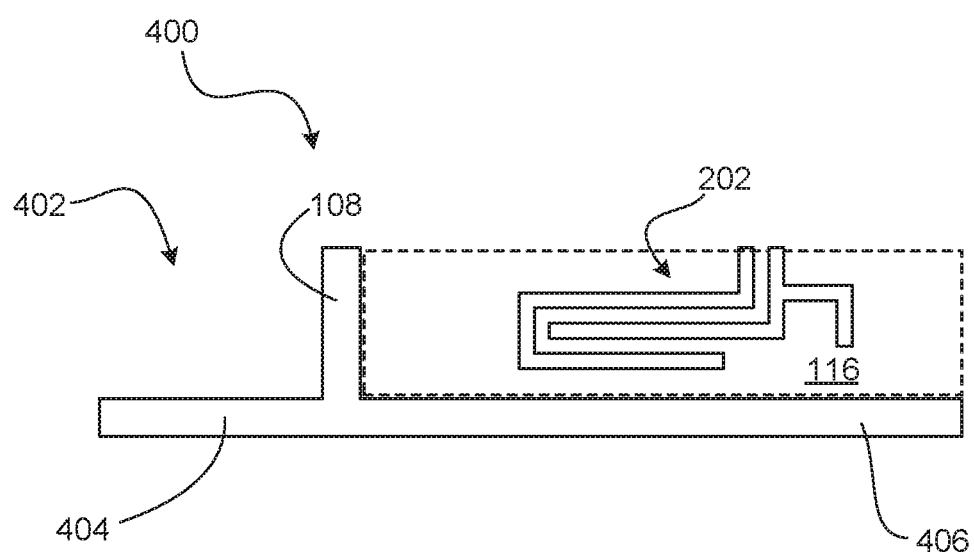
FIG. 4 is a plan view of example co-located and isolated antennas including a wide area antenna having straight arms.

FIG. 4 shows an example antenna structure 400 including a first antenna 402 and a second antenna 202. Description for the other devices and antennas discussed herein may be referenced, with like reference numerals denoting like components. Features and aspects of the antenna structure 400 may be used with the other devices and antennas discussed herein, and vice versa.

The first antenna 402 may include extended arms 404, 406 that extend in opposite directions from a first feed arm 108, including an extended arm 406 that defines a boundary of a secondary antenna area 116 that contains the second antenna 202. The extended arms 404, 406 may be straight and may be collinear.

Figure 5:
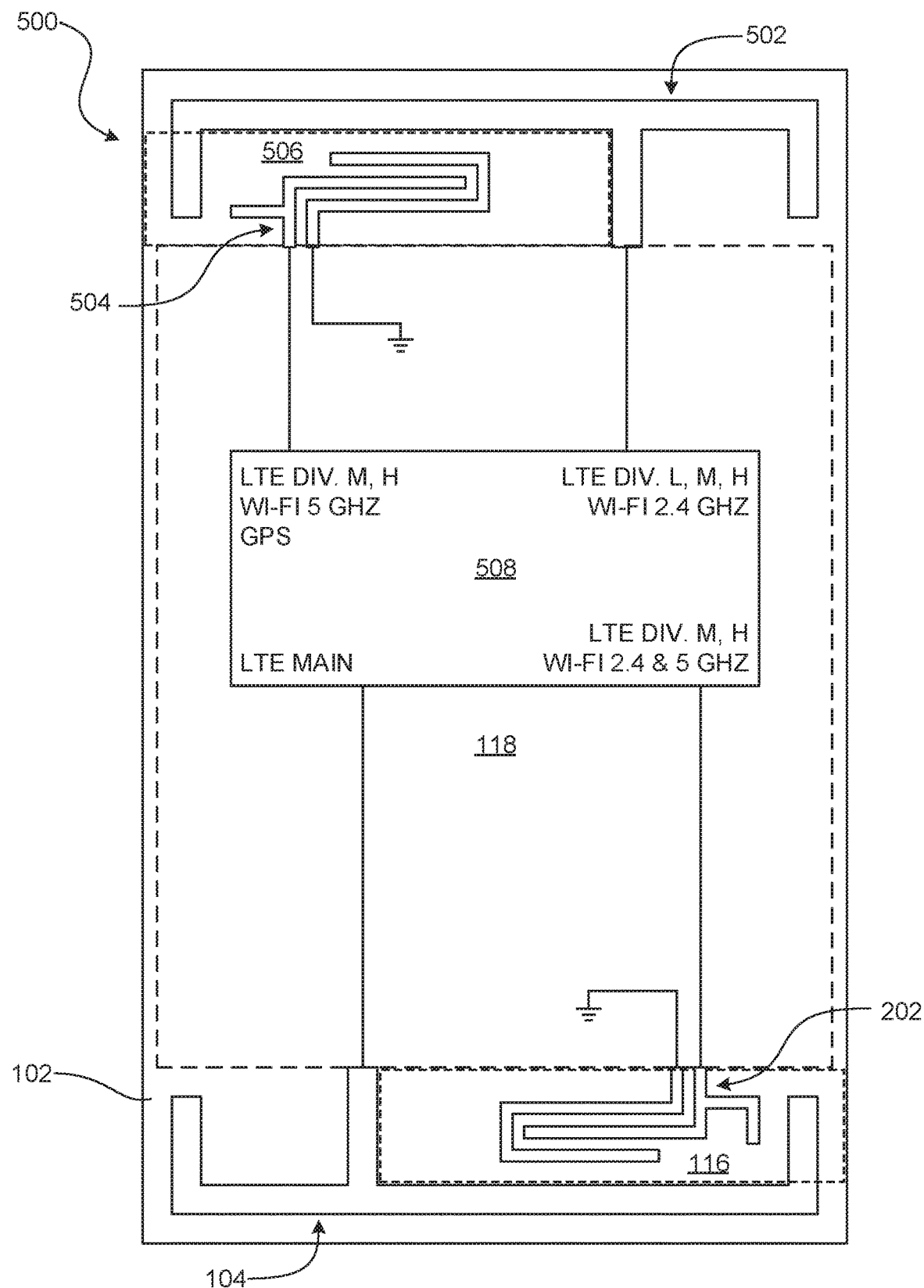
FIG. 5 is a plan view of an example device that includes multiple sets of example co-located and isolated antennas.

FIG. 5 shows an example device 500. Description for the other devices and antennas discussed herein may be referenced, with like reference numerals denoting like components. Features and aspects of the device 500 may be used with the other devices and antennas discussed herein, and vice versa.

The device 500 includes a lower first antenna 104 and a lower second antenna 202 located at a lower end of a substrate 102, The lower second antenna 202 is disposed within a lower secondary antenna area 116 that is co-located with the lower first antenna 104 and enclosed by boundaries that include the lower first antenna 104, an edge of the substrate 102, and a display 118 coupled to the substrate 102.

The device 500 includes an upper first antenna 502 and an upper second antenna 504 located at an upper end of the substrate 102. The upper second antenna 504 is disposed within an upper secondary antenna area 506 that is co-located with the upper first antenna 502 and enclosed by boundaries that include the upper first antenna 502, an edge of the substrate 102, and the display 118.

The terms "lower" and "upper" are used for sake of explanation with respect to the view depicted, and these terms carry no positional or directional limitation or other connotation.

The lower first antenna 104, the lower second antenna 202, the upper first antenna 502, and the upper second antenna 504 are connected to a circuit 508. The circuit 508 may operate the antennas 104, 202, 502, 504 as a 4-by-4 LTE MIMO array and a 2-by-2 Wi-Fi MIMO array. For example, the circuit 508 may control the lower first antenna 104 to operate in low, mid, and high LTE frequency bands. The circuit 508 may control the lower second antenna 202 to operate as a diversity antenna for mid and high LTE frequency bands and to operate as a dual band (e.g., 2.4/5 GHz) Wi-Fi antenna. The circuit 508 may control the upper first antenna 502 to operate as a diversity antenna for low, mid, and high LTE frequency bands and to operate as a low band (e.g., 2.4 GHz) Wi-Fi antenna. The circuit 508 may control the upper second antenna 504 to operate as a diversity antenna for mid and high LTE frequency bands and to operate as a high band (e.g., 5 GHz) Wi-Fi antenna. The circuit 508 may additionally control the upper second antenna 504 to operate as a Global Positioning System (GPS) antenna.

Figure 6:
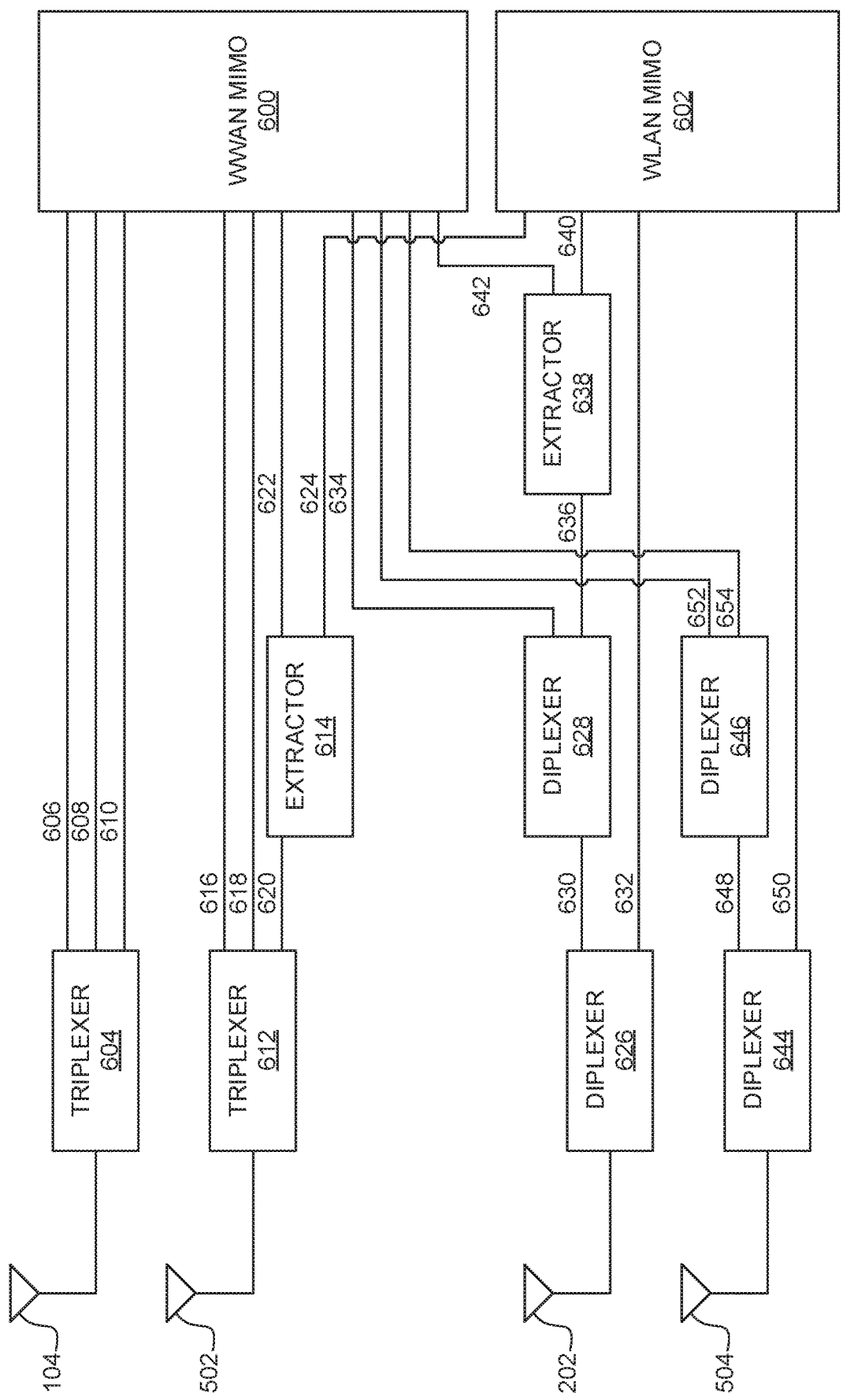
FIG. 6 is a block diagram of an example circuit for multiple sets of example co-located and isolated antennas.

FIG. 6 shows an example transmitter and/or receiver circuit 508 that includes a WWAN MIMO circuit 600 and a WLAN MIMO circuit 602. The transmitter and/or receiver circuit 508 may be used with any of the devices and antennas described herein. In this example, the circuit 508 has a multiplexing structure to transmit and receive LTE and Wi-Fi signals.

The circuit 508 may include a main WWAN triplexer 604 that connects a lower first antenna 104 to the WWAN MIMO circuit 600, Low band; mid band, and high band WWAN signals 606, 608, 610 may be transmitted and received with the WWAN MIMO circuit 600 at the lower first antenna 104 via the main WWAN triplexer 604.

The circuit 508 may further include a WWAN diversity triplexer 612 that connects an upper first antenna 502 to the WWAN MIMO circuit 600 and to a first extractor 614. Low and mid band WWAN diversity signals 616, 618 may be received from the upper first antenna 502 and provided to the WWAN MIMO circuit 600 via the WWAN diversity triplexer 612. A signal 620 communicated at the upper first antenna 502 may include a high-band WWAN component 622 and a low-band WLAN component 624, which may be extracted from the signal 620 via the first extractor 614. The first extractor 614 may provide the high-band WWAN component 622 to the WWAN MIMO circuit 600 and may communicate the low-band WLAN component 624 with the WLAN MIMO circuit 602.

The circuit 508 may further include a first diplexer 626 having one output connected to a second diplexer 628 and another output connected to the WLAN MIMO circuit 602. The first diplexer 626 may communicate a signal containing a mid and high band WWAN diversity signal 630 and a high-band WLAN signal 632 with the lower second antenna 202. The first diplexer 626 may provide the mid and high band WWAN diversity signal 630 to the second diplexer 628 and may communicate the high-band WLAN signal 632 with the WLAN MIMO circuit 602. The second diplexer 628 may separate the mid and high band WWAN diversity signal 630 into a mid band WWAN signal 634, which may be provided to the WWAN MIMO circuit 600, and a high band WWAN diversity signal 636, which may be provided to a second extractor 638. The second extractor 638 may extract a low-band WLAN signal 640 from the signal 636 and communicate the low-band WLAN signal 640 with the WLAN MIMO circuit 602, while providing the high band WWAN component 642 to the WWAN MIMO circuit 600.

The circuit 508 may further include a third diplexer 644 having one output connected to a fourth diplexer 646 and another output connected to the WLAN MIMO circuit 602. The third diplexer 644 may communicate a signal containing a mid and high band WWAN diversity signal 648 and a high-band WLAN signal 650 with the upper second antenna 504. The third diplexer 644 may provide the mid and high band WWAN diversity signal 648 to the fourth diplexer 646 and may communicate the high-band WLAN signal 650 with the WLAN MIMO circuit 602. The fourth diplexer 646 may separate the mid and high band WWAN diversity signal 648 into a mid band WWAN diversity signal 652 and a high band WWAN diversity signal 654, which may be provided to the WWAN MIMO circuit 600.

Figure 7:
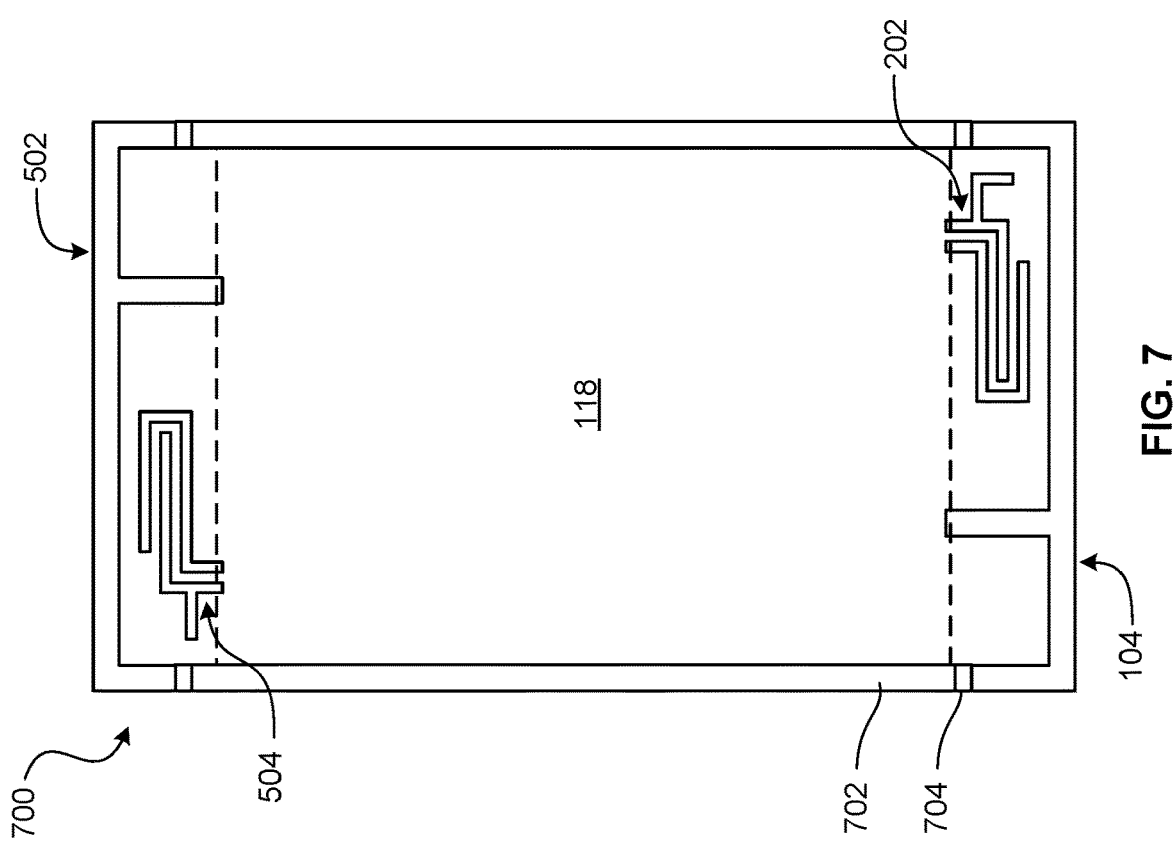
FIG. 7 is a plan view of an example device that includes example co-located and isolated antennas including wide area antennas integrated with a display bezel.

FIG. 7 shows an example device 700. Description for the other devices and antennas discussed herein may be referenced, with like reference numerals denoting like components. Features and aspects of the device 700 may be used with the other devices and antennas discussed herein, and vice versa.

The device 700 includes a pair of first antennas 104, 502 and a pair of second antennas 202, 504 located at opposite ends. A second antenna 202, 504 may be co-located with a respective first antenna 104, 502.

The first antennas 104, 502 may be integrated with a metal bezel 702 of a display device 118. Extended arms of the first antennas 104, 502 may be made of the same or similar material as the bezel 702 and may be electrically separated from the bezel 702 by dielectric material 704, such as plastic, an air gap, or similar.

Figure 8:
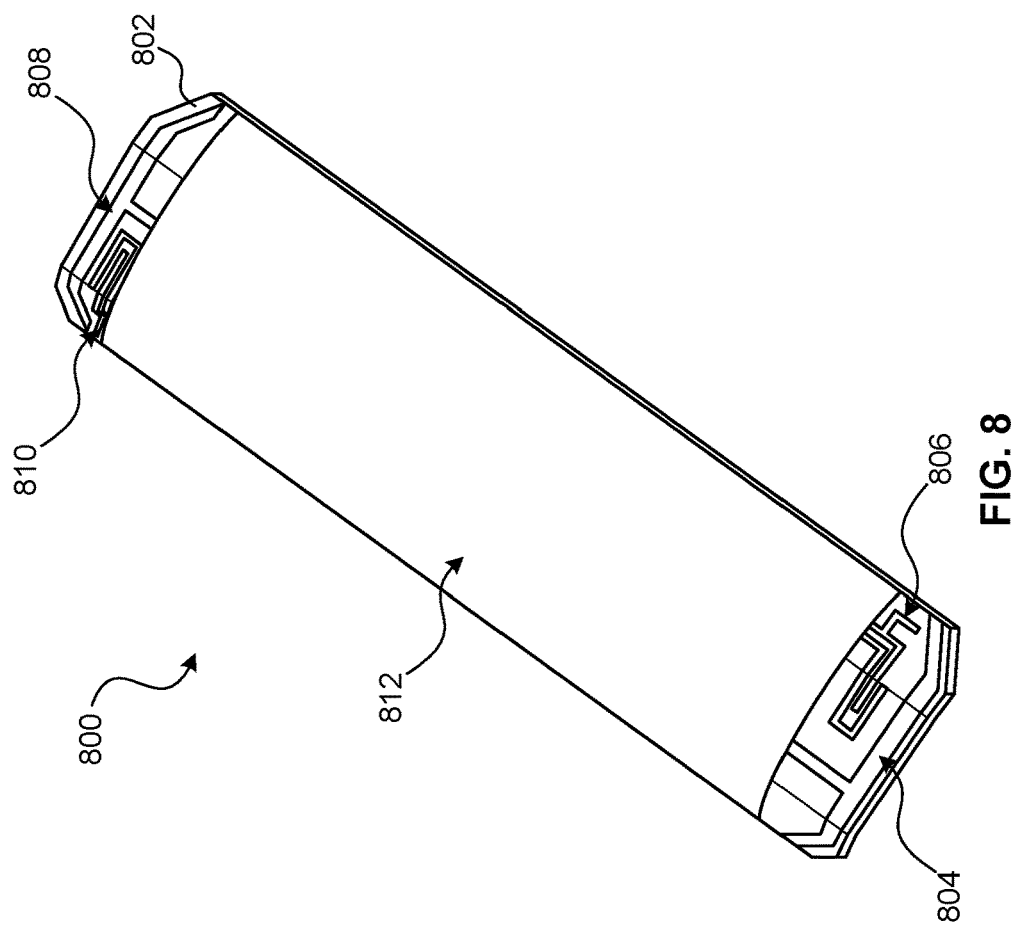
FIG. 8 is a perspective view of an example device that includes example co-located and isolated antennas on a non-flat substrate.

FIG. 8 shows an example device 800, Description for the other devices and antennas discussed herein may be referenced, with like reference numerals denoting like components. Features and aspects of the device 800 may be used with the other devices and antennas discussed herein, and vice versa.

The device 800 includes a non-planar substrate 802. The substrate 802 may include a plurality of facets. A facet may be planar.

A lower first antenna 804 and a lower second antenna 806 may be disposed on the substrate 802 at a lower end of the substrate 802. The lower first antenna 804 and the lower second antenna 806 may span a plurality of facets of the substrate 802. The lower second antenna 806 may be co-located with the lower first antenna 804 and may include a coupled arm to isolate the antennas 804, 806 and to provide capacitive coupling to provide diversity to the lower first antenna 804.

An upper first antenna 808 and an upper second antenna 810 may be disposed on the substrate 802 at an upper end of the substrate 802. The upper first antenna 808 and the upper second antenna 810 may span a plurality of facets of the substrate 802. The upper second antenna 810 may be co-located with the upper first antenna 808 and may include a coupled arm to isolate the antennas 808, 810. The coupled arm may provide capacitive coupling to provide diversity to the upper first antenna 808.

The device 800 may include a display 812 that constrains available space for the antennas 804-810. The display 812 may be a flexible or curved display. The device 800 may be a wearable device and may be shaped to fit a contour of a human body. The antennas 804-810 may all be located on a same side of the substrate 802 and may be considered to be at the same Z height irrespective of a non-planar or faceted shape of the substrate 802.

In view of the above, it should be apparent that antennas may be co-located and isolated by way of a grounded coupled arm, which may also allow one of the antennas to provide diversity for another. The antennas may be provided in a compact structure, for example, at a same Z height on a planar or faceted substrate. This may reduce the amount of space required for the antennas, particularly when positioned near a display device, and facilitate devices with small form factors. Further, two sets of such antennas may be used to implement a 4-by-4 LTE MIMO array and a 2-by-2 Wi-Fi MIMO array.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
   a substrate;
   a first antenna disposed on the substrate, the first antenna including a first feed arm to connect to a circuit, the first antenna further including a pair of extended arms extending in opposite directions from the first feed arm, the first antenna co-located with a secondary antenna area on the substrate, the secondary antenna area bounded by the first feed arm and by a first extended arm of the pair of extended arms, the secondary antenna area further to be bounded by a display and by an outer edge of the substrate; and
   a second antenna disposed on the substrate within the secondary antenna area, the second antenna including a second feed arm to connect to the circuit, the second antenna further including a coupled arm, the coupled arm distant from the second feed arm, the coupled arm positioned between the second feed arm and the first feed arm of the first antenna.

2. The device of claim 1, wherein the circuit is to control the second antenna to operate in a wireless local area network and is further to control the second antenna to operate as a diversity antenna for the first antenna in a wireless wide area network.

3. The device of claim 2, wherein the coupled arm is capacitively coupled to the second feed arm to operate as the diversity antenna.

4. The device of claim 2, wherein the second antenna further comprises a high-frequency arm extending from the second feed arm to operate in the wireless local area network.

5. The device of claim 1, wherein the coupled arm is grounded.

6. A device comprising:
a substrate;
a first antenna disposed on the substrate, wherein the first antenna is T-shaped; and
a second antenna disposed on the substrate and co-located with the first antenna, the second antenna including a second feed arm and a grounded coupled arm that is distant from the second feed arm, the grounded coupled arm positioned between the second feed arm and a first feed arm of the first antenna to isolate the second antenna from the first antenna, the grounded coupled arm to capacitively couple to the second feed arm to operate as a diversity antenna of the first antenna.

7. The device of claim 6, further comprising a circuit to control the first antenna to operate in a wireless wide area network and to control the second antenna to operate in a wireless local area network.

8. The device of claim 6, wherein the first antenna includes extended arms that extend from the first feed arm, wherein the extended arms are straight.

9. The device of claim 6, wherein the first antenna includes extended arms that extend from the first feed arm, wherein the extended arms are bent.

10. The device of claim 6, wherein the first antenna includes extended arms that extend from the first feed arm, wherein the extended arms are angled.

11. The device of claim 6, wherein the first antenna and the second antenna are located on a same side of the substrate.

12. A device comprising:
a substrate;
a first antenna disposed on the substrate, wherein the first antenna includes a first feed arm and a pair of extended arms extending in opposite directions from the first feed arm; and
a second antenna disposed on the substrate and co-located with the first antenna, the second antenna and the first antenna located on a same side of the substrate at a same Z height, the second antenna including a second feed arm and a grounded coupled arm that is distant from the second feed arm, the grounded coupled arm positioned between the second feed arm and the first feed arm of the first antenna to isolate the second antenna from the first antenna, the grounded coupled arm to capacitively couple to the second feed arm to operate as a diversity antenna of the first antenna.

13. The device of claim 12, further comprising a circuit to control the first antenna to operate in a wireless wide area network and to control the second antenna to operate in a wireless local area network.

14. The device of claim 12, wherein the first antenna is a lower first antenna located at a lower end of the substrate and the second antenna is a lower second antenna located at the lower end of the substrate, the device further comprising an upper first antenna located at an upper end of the substrate and an upper second antenna located at the upper end of the substrate, the upper second antenna co-located with the upper first antenna, the upper second antenna including a second grounded coupled arm to isolate the upper second antenna from the upper first antenna and to cause the upper second antenna to operate as a diversity antenna of the lower first antenna.

15. The device of claim 14, further comprising a display located between the upper first antenna and the upper second antenna.

* * * * *